United States Patent [19]
Takada

[11] 3,897,106
[45] July 29, 1975

[54] VEHICLE SAFETY BELT

[75] Inventor: Takezo Takada, 1742 Hikotomi-cho, Hikone, Japan

[73] Assignee: Takata Kojyo Co., Ltd., Tokyo, Japan

[22] Filed: July 16, 1973

[21] Appl. No.: 379,294

[30] Foreign Application Priority Data
July 22, 1973  Japan.................................. 48-73030

[52] U.S. Cl............................. 297/389; 280/150 SB
[51] Int. Cl.².................... A47D 15/00; B60R 21/10
[58] Field of Search.......... 297/385, 389; 139/383 R, 139/411; 280/150 SB

[56] References Cited
UNITED STATES PATENTS

| | | | |
|---|---|---|---|
| 2,794,450 | 6/1957 | Gatzke................................. | 139/411 |
| 3,464,459 | 9/1969 | Ballard............................ | 139/383 R |
| 3,547,468 | 12/1970 | Giuffrida........................ | 280/150 SB |

FOREIGN PATENTS OR APPLICATIONS

| | | | |
|---|---|---|---|
| 1,124,995 | 8/1968 | United Kingdom................. | 297/389 |
| 990,331 | 4/1965 | United Kingdom................. | 297/389 |
| 1,903,055 | 8/1970 | Germany....................... | 280/150 SB |

Primary Examiner—Paul R. Gilliam
Assistant Examiner—Andrew M. Calvert
Attorney, Agent, or Firm—Wolder & Gross

[57] ABSTRACT

A vehicle safety belt system of the three point type includes a lap belt and a shoulder belt the shoulder belt having lower and upper sections, the upper section having greater elongation under a predetermined load and a greater plastic deformation than that of the shoulder belt lower portion and the lap belt so as to provide the optimum action both in the restraint of the occupant attendant to collision and in minimizing occupant reactive fling back or back lash. The upper part of the shoulder belt may be of the same width as the lower part but of different construction or yarns of high elongation and plastic deformation or it may be of lesser width than the shoulder belt lower part.

7 Claims, 11 Drawing Figures

PATENTED JUL 29 1975  3,897,106

SHEET 1

PATENTED JUL 29 1975 3,897,106
SHEET 2
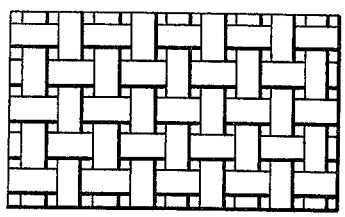
Fig.4.
Fig.4A.
Fig.5.
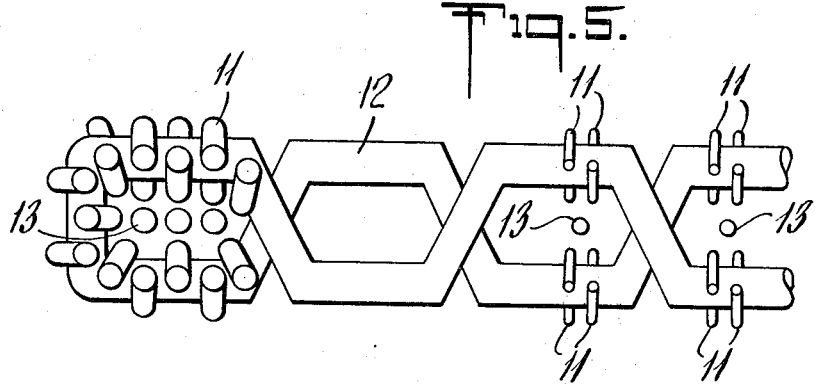
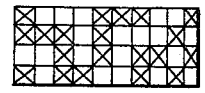
Fig.5A.
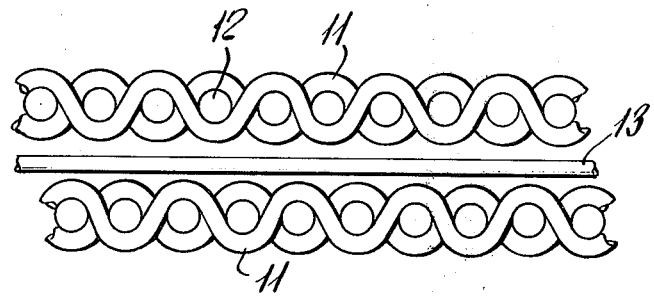
Fig.6.
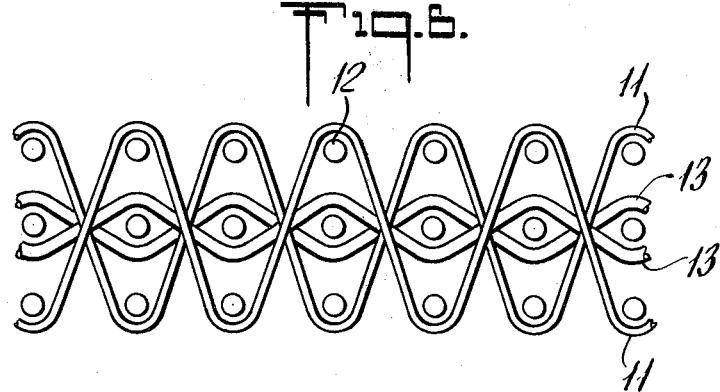

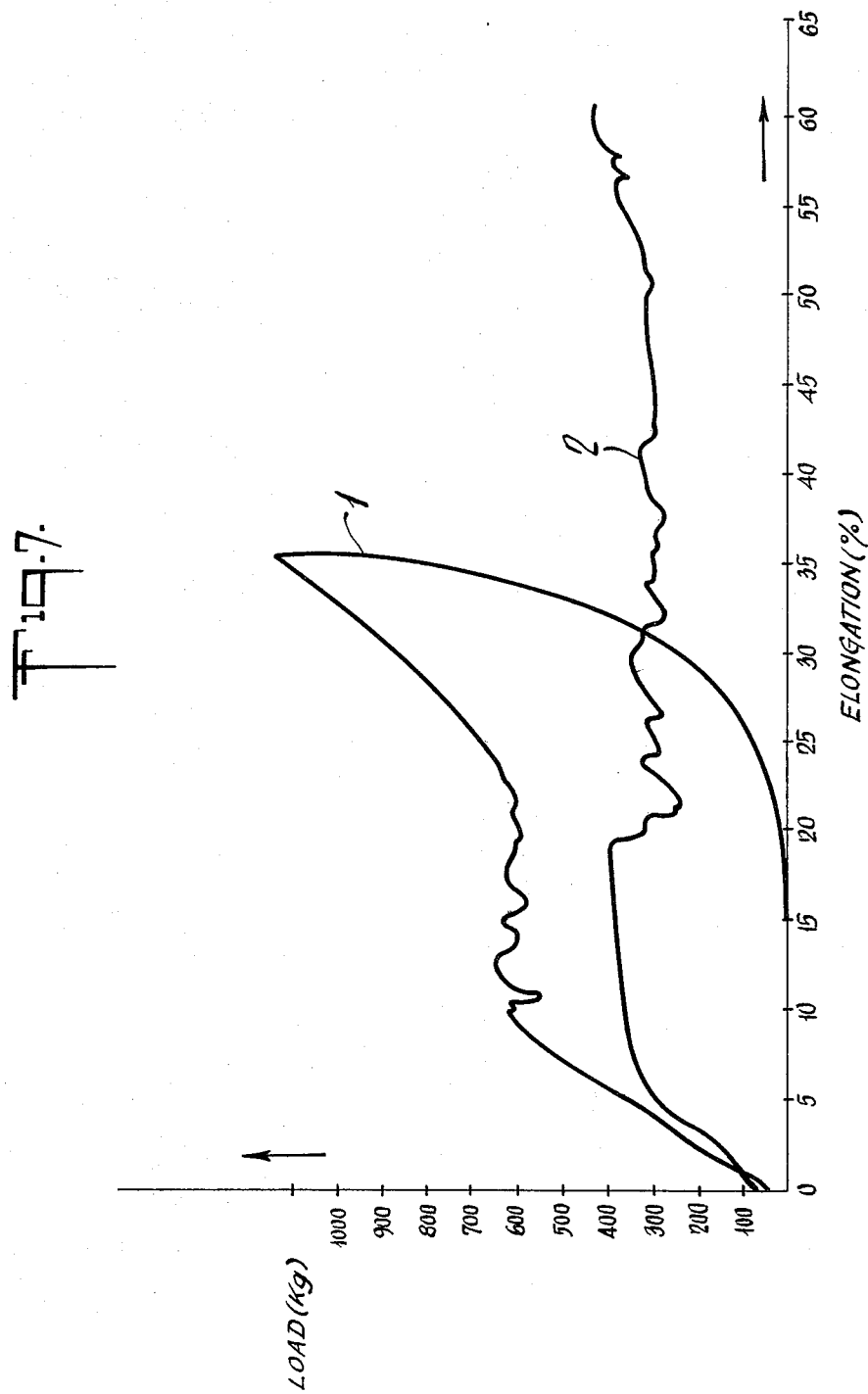

VEHICLE SAFETY BELT

BACKGROUND OF THE INVENTION

The present invention relates generally to improvements in vehicle occupant safety devices and it relates more particularly to an improved vehicle safety belt which restrains a seat occupant in the event of a collision and inhibits any violent occupant spring back or whiplash following such restraint.

The conventional vehicle safety belt system functions to restrain the forward motion of an occupant, the driver or a passenger, from his seat in the event of a collision or other sudden stopping or flipping of the vehicle. The object of such functioning is not only to prevent the seat occupant from being flung forward due to his momentum and consequent to such sudden stopping into the vehicle windshield but also to prevent him from striking the dashboard, steering wheel or other object or part of the vehicle. However, the conventional safety belt system possesses an important drawback, in that while it may prevent the relative forward motion of the seat occupant consequent to a collision, it does not irretrievably absorb the kinetic energy of the occupant.

On the contrary, the restraining safety belt, particularly the shoulder belt, elastically elongates, so that upon the occupant reaching his forwardmost position he is sharply flung rearwardly by the contraction of the elastically elongated belt and this reaction is a common cause of injury, frequently very seriously, to the occupant, as for example, with a resulting broken cervical vertabrae. The use of an energy absorbing web having a nonrecoverable plastic deformation under load for the safety belt has been proposed but this also has disadvantages, in that if it suitably absorbs the occupant's kinetic energy it does not satisfactorily restrict his forward motion upon collision and otherwise leaves much to be desired.

SUMMARY OF THE INVENTION

It is a principal object of the present invention to provide an improved vehicle safety belt system.

Another object of the present invention is to provide an improved vehicle safety belt system of the type which absorbs the kinetic energy of an occupant attendant to a collision.

Still another object of the present invention is to provide an improved vehicle safety belt system which optimumly restricts the forward motion of an occupant consequent to a collision and does not sharply fling the occupant rearwardly after he reaches his forwardmost position.

A further object of the present invention is to provide a safety belt system of the above nature characterized by its reliability, superior operating characteristics, convenience, and great versatility and reliability.

The above and other objects of the present invention will become apparent from a reading of the following description taken in conjunction with the accompanying drawings which illustrate preferred embodiments thereof.

In a sense, the present invention contemplates the provision of a vehicle safety belt system which includes a shoulder belt including an upper or rear portion and a front or lower portion, the upper portion having a higher nonrecoverable elongation or plastic deformation than the lower portion at a predetermined equal stress. In addition the overall elongation per unit length of the shoulder belt upper part is greater than that of the lower part under the same loading. The shoulder belt upper and lower parts are joined, such as by being overlapped and sewn together at their ends, the joined portion, when the belt is in use, advantageously being located proximate the occupant's shoulder. The different elongation and plastic deformation properties which characterize the shoulder belt upper and lower portions may be obtained by using different web fabric constructions for the upper and lower belt sections in which the upper section possesses a much greater weave crimp than the lower section, or the yarns forming the upper section fabric warps may have greater elongation and plastic deformation than those of the lower section or by both expedients. Thus the warp yarns of the lower belt section may be formed of nylon which has an 80 percent recovery of its elongation when stretched 10 percent, whereas the upper section warp yarns may be formed of polyester or rayon staple which have only 60 percent and 28 percent recovery respectively when stretched 10 percent. In attaining a greater weave crimp for the rear belt section its weave structure may be plain, a triple weft construction, a hollow weave and the like, whereas the lower belt section may be a twill or similar weave in which the warp possesses little weave crimp. When the belt upper section is of triple weft construction, a twill weave may be employed, which has a high elongation and great difference of shrinkage between the core thread and the warp due to the weaving shrinkage of the warp itself effected by the core yarn and warp of high elongation. Other means may be effected for obtaining different elongations and plastic recoveries while using similar fibers such as selective heat treatment and the like. Another expedient which may be employed to great advantage in achieving greater elongation and plastic deformation properties in the upper belt section as compared to the lower belt section is by making the upper belt section thinner. The shoulder belt of the above properties is advantageously employed with a lap or waist belt, preferably in a three point system in which the lap belt has elongation and plastic deformation properties corresponding to the lower portion of the shoulder belt.

The improved safety belt system, by reason of the different elongation and plastic deformation properties of the shoulder belt upper and lower sections, as described above, restrains the occupant in a vehicle seat during a collision and minimizes fling back in a optimum manner, and is reliable, compact, rugged and highly versatile.

BRIEF DESCRIPTION OF THE DRAWINGS

FIG. 4 is a view similar to FIG. 2 of a weave construction for the shoulder belt upper section;

FIG. 4A is an end view thereof;

FIG. 5 is an enlarged front view of a hollow weave which may be employed in the shoulder belt;

FIG. 5A is an end view thereof;

FIG. 6 is an end view of a triple weft weave; and

FIG. 7 is a characteristic graph of a belt employing the construction of FIG. 6 in the shoulder belt upper section.

DESCRIPTION OF THE PREFERRED EMBODIMENTS

Figure 1:
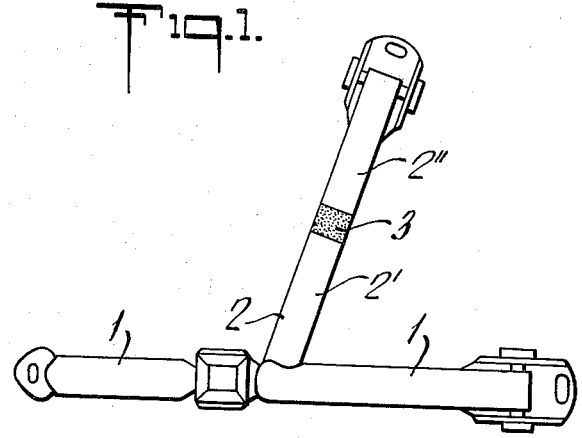
FIG. 1 is a plan view of a three point safety belt employing the present invention.

Referring now to the drawings, particularly FIG. 1 thereof which illustrates a preferred embodiment of the present invention, the improved safety belt system includes a waist or lap belt 1 and a shoulder belt 2 associated to form a three point safety belt system. The lap belt 1 includes two sections separably coupled by a buckle and mating tongue the outer end of one section terminating in an anchor plate and the other end being wound on a take-up reel which may be controlled in response to the actuation of an inertia switch. The anchor plate and reel are suitably located.

The shoulder belt 2 has its lower end connected to or formed with the inner end of the reel connected lap belt section or connected to the buckle tongue and its upper end wound on a take-up reel similar to the shoulder belt reel and mounted at or above shoulder level and rearwardly of the occupant shoulder position.

The shoulder belt 2, in accordance with the present invention is formed of a lower section 2' and an upper section 2'' joined to each other at a point preferably corresponding to the shoulder position of the seat occupant such as by overlapping the adjacent ends of shoulder belt sections 2' and 2'' and stitching the overlapping sections together such as at 3. The lower shoulder belt section 2' may be of conventional safety belt construction and being characterized by relatively low elongation and low plastic deformation or low non-recoverable elongation properties. On the other hand, the upper shoulder belt section 2'' possesses elongation and plastic deformation properties greater than those of the lower shoulder belt section 2'. Further, the lap belt 1 likewise possesses elongation and plastic deformation properties less than that of upper shoulder belt section 2'' and may be of the same properties and be similar to lower shoulder belt section 2'.

Figure 2:
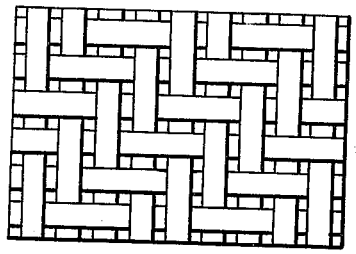
FIG. 2 is an enlarged plan view of a weave construction for the shoulder belt lower section.
Figure 2A:
FIG. 2A is an end view thereof.
Figure 3:
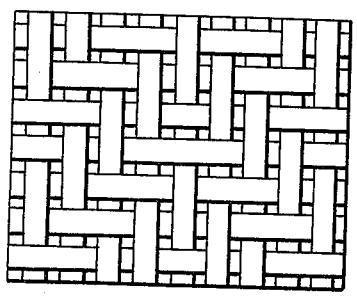
FIG. 3 is a view similar to FIG. 2 of another weave construction.
Figure 3A:
FIG. 3A is an end view thereof.

As set forth above the belts 1 and 2 are formed of woven bands in which the different elongation and plastic deformation properties are achieved by the fibers employed in the warp and core yarns and by the weave construction of the belt webs. Thus by the use of nylon, polyester and rayon staple fibers in the respective sections different elongation rates and non-recoverable elongations are achieved, for example tne nylon being primarily employed in lower belt section 2' and polyester or the rayon staple being employed in the upper belt section 2''. The twill weave shown in FIG. 2 and the herringbone weave shown in FIG. 3, for example, may be advantageously employed for the lower belt section 2' and the plain weave shown in FIG. 4, the tubular weave shown in FIG. 5 and the triple weft weave shown in FIG. 6 may be employed to advantage. In FIG. 5 and 6 the reference numeral 11 generally designates the warp, 12 the weft and 13 core threads.

In accordance with a specific example of the construction of the upper shoulder belt section 2'' a woven band of triple weft weave construction is employed, as illustrated in FIG. 6 in which the warp is nylon, 1,000 denier type 730, 2-thread single twisted 196-threads; the core thread is polyester, 250 denier type 303, 3-thread single twist 18-thread and the weft is 1260 denier, nylon 781 S. The elongation versus load characteristics of the safety belt employing the above construction in the upper shoulder belt section 2'' is illustrated in FIG. 7 of the drawings, the response of the upper belt section 2 being represented by the curve 1.

Figure 1A:
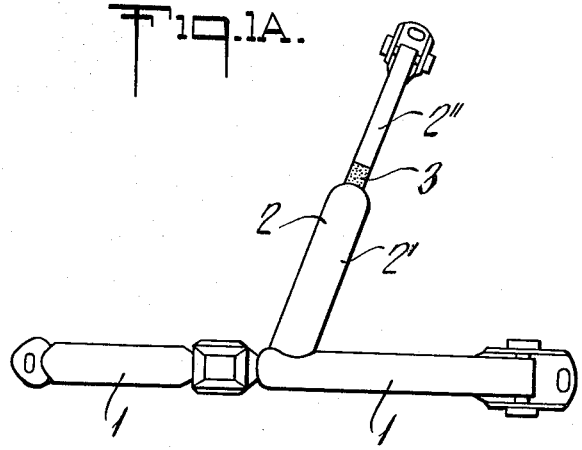
FIG. 1A is a view similar to FIG. 1 of another embodiment of the present invention.

Another embodiment of the present invention is shown in FIG. 1A of the drawings in which similar parts are designated by the same reference numerals as the embodiment shown in FIg. 1 and it differs from the first embodiment primarily in that the shoulder upper belt section 2'' is of lesser width than the corresponding upper belt section of the first embodiment. In effecting the desired elongation and plastic deformation characteristics in the upper and lower belt sections as explained above, the modified properties of the upper belt consequent to its being narrower must be considered. The use of a narrower upper belt section possesses the additional advantages of compactness and the use of a smaller less expensive take-up reel. By way of example, the upper section 2'' is half the width of the lower belt section 2' which is of standard width.

While there have been described and illustrated preferred embodiments of the present invention it is apparent that numerous alterations, insertions and additions may be made without departing from the spirit thereof.

I claim:

1. A vehicle safety belt of the three point type for restraining an occupant in a seat comprising a shoulder belt including upper and lower sections joined in series at an elongation transition section which is disposed at the normal position of the shoulder of said seat occupant when said shoulder belt is in applied position, and a lap belt coupled to said shoulder belt to form a three point safety belt system, said shoulder belt upper section having a greater elongation per unit length at a predetermined load than said shoulder belt lower section and than said lap belt and further characterized in that said belt upper section possesses an elongation versus load characteristic wherein said belt upper section recoverably extends with increasing load up to a predetermined value and then non-recoverably extends under little load increase for a predetermined elongation and thereafter further recoverably extends with increased load to a predetermined point, release of the stress thereafter on said belt upper section resulting in its contraction to a length greater than its original length by substantially said non-recoverable elongation.

2. A vehicle safety belt of the three point type for restraining an occupant in a seat comprising a shoulder belt including upper and lower sections joined in series at an elongation transition section which is disposed at the normal position of the shoulder of said seat occupant when said shoulder belt is in applied position and a lap belt coupled to said shoulder belt to form a three point safety belt system, said shoulder belt upper section having a greater non-recoverable elongation per unit length at a predetermined load than said shoulder belt lower section and than said lap belt and further characterized in that said belt upper section possesses an elongation versus load characteristic wherein said belt upper section recoverably extends with increasing load up to a predetermined value and then non-recoverably extends under little load increase for a predetermined elongation and thereafter further recoverably extends with increased load to a predetermined point, release of the stress thereafter on said belt upper section resulting in its contraction to a length greater than its original length by substantially said non-recoverable elongation.

3. The vehicle safety belt of claim 2 wherein said shoulder belt upper section has a greater overall elongation per unit length than said lower section and said lap belt at said predetermined load.

4. The vehicle safety belt of claim 3 wherein said shoulder belt lower section and said lap belt are formed of similar woven textile bands.

5. The vehicle safety belt of claim 3 wherein said shoulder belt upper and lower sections are formed of woven textile bands the upper section band having warp yarns with greater elongation per unit length than that of said lower section at a predetermined load.

6. The vehicle safety belt of claim 3 wherein said shoulder belt upper and lower sections are formed of woven textile bands with the warp of said upper section having a greater weave crimp than said lower section.

7. The vehicle safety belt of claim 6 wherein the warp yarns in said lower section possess at least an 80 percent recovery in length when stretched 10 percent and the warp yarns in said lower section have a recovery in length not exceeding 60 percent when stretched 10 percent.

* * * * *

UNITED STATES PATENT AND TRADEMARK OFFICE
CERTIFICATE OF CORRECTION

PATENT NO. : 3,897,106
DATED : July 29, 1975
INVENTOR(S) : Takezo Takada

It is certified that error appears in the above-identified patent and that said Letters Patent are hereby corrected as shown below:

Claim 7, line 4: Delete "lower" and substitute

--upper--

Signed and Sealed this

Twelfth Day of October 1976

[SEAL]

*Attest:*

RUTH C. MASON
*Attesting Officer*

C. MARSHALL DANN
*Commissioner of Patents and Trademarks*